Jan. 12, 1971  H. T. ROBINSON  3,554,639
SLIDE TRAY FOR A SLIDE PROJECTOR
Filed Jan. 9, 1968  4 Sheets-Sheet 1

HERBERT T. ROBINSON
INVENTOR.

BY Steve W. Gremban
Robert W. Hampton
ATTORNEYS

Jan. 12, 1971  H. T. ROBINSON  3,554,639
SLIDE TRAY FOR A SLIDE PROJECTOR
Filed Jan. 9, 1968  4 Sheets-Sheet 2

HERBERT T. ROBINSON
INVENTOR.

BY
ATTORNEYS

Jan. 12, 1971  H. T. ROBINSON  3,554,639

SLIDE TRAY FOR A SLIDE PROJECTOR

Filed Jan. 9, 1968  4 Sheets-Sheet 3

HERBERT T. ROBINSON
INVENTOR.

BY
ATTORNEYS

Jan. 12, 1971     H. T. ROBINSON     3,554,639

SLIDE TRAY FOR A SLIDE PROJECTOR

Filed Jan. 9, 1968     4 Sheets-Sheet 4

HERBERT T. ROBINSON
INVENTOR.

BY Steve W. Trumbau
Robert W. Hampton
ATTORNEYS

United States Patent Office 3,554,639
Patented Jan. 12, 1971

3,554,639
SLIDE TRAY FOR A SLIDE PROJECTOR
Herbert T. Robinson, Rochester, N.Y., assignor to Eastman Kodak Company, Rochester, N.Y., a corporation of New Jersey
Filed Jan. 9, 1968, Ser. No. 696,573
Int. Cl. G03b 23/06
U.S. Cl. 353—117                                    21 Claims

ABSTRACT OF THE DISCLOSURE

An improved slide tray for a slide projector in which the tray has a compartmented body member for slides, and in addition may have a slide retaining member carried by and movable relative to the body member. When a slide tray of the latter type is mounted in a slide projector, the slide retaining member is held in a fixed position with a slide exit slot therein in register with the slide projection gate of the projector. The slide tray has, among other things, an improved mechanism through which the compartmented member may be indexed one slide compartment at a time in forward and reverse directions during projection operation, an improved slide guiding mechanism for guiding slides into and out of the slide compartments, and an improved detent mechanism for precisely locating the slide tray members with each slide compartment in registry with the slide exit slot and slide projection gate.

BACKGROUND OF THE INVENTION

This invention relates generally to slide projectors, and more specifically to an improved slide tray for a slide projector.

Slide projectors of the type utilizing a slide tray, and slide tray indexing means on the projector and tray for indexing the tray in forward and reverse directions for successively projecting the slides contained therein are generally well known in the art. One of the many well known slide projectors of this general type that are presently commercially available on the market is the Carousel slide projector, in which Carousel is a registered trademark of the Eastman Kodak Company. One model of this slide projector is disclosed in U.S. Pat. No. 3,276,314. A circular slide tray for use in a slide projector of this type is disclosed in U.S. Pat. No. 3,276,156, and an indexing means for indexing the slide tray is disclosed in U.S. Pat. No. 3,236,113. Due to the physical dimensions of this Carousel slide projector and tray, and the means employed therein for indexing the slide tray in forward and reverse directions, the capacity of the slide tray is limited to a predetermined number of slides. The present invention is directed to an improved slide tray for use in a slide projector of this general type in which the indexing means on the tray has a lost motion means incorporated therein so that the tray is indexed a fraction of the distance it had been indexed heretofore. Since the slide tray is indexed one slide compartment at a time, the width of the slide compartment must be reduced to a fraction of its former width to correspond to the reduced distance the tray is indexed. As a consequence, the slide tray is capable of accommodating substantially twice as many slides as the prior known slide tray. This, of course, permits the operator to project approximately twice as many slides for each showing. In addition, the slide tray provides a slide tray storage container of increased capacity, capable of storing approximately twice as many slides as heretofore at a reduced cost per slide stored.

SUMMARY OF THE INVENTION

This invention includes within its scope an improved slide tray of reduced slide compartment size and hence of increased slide capacity for a slide projector, and having means incorporated therein for reducing the incremental distance the tray is advanced for each slide change in conformity with the reduction in slide compartment size. More specifically, the tray has a compartmented body member for slides, and a slide retaining member carried by and movable relative to the body member. The slide retaining member has a slide exit slot which is in register with the slide projection gate of the projector when the slide tray is mounted on the projector. The slide tray has indexing means operated by the projector indexing means for indexing the body member in forward and reverse directions one slide compartment at a time for each cycle of operation of the slide projector for sequentially projecting each slide in the slide tray. A detent means releasably holds the body and retaining members together in a slide storing mode, in which one slide compartment has a bridge across one end thereof in register with the slide exit slot for preventing the entry of a slide into the slide compartment from the one end. The detent means in combination with slide tray locating means precisely locates the body and retaining members relative to one another with the slide exit slot in register with a slide compartment and slide projection gate. In addition, interaction between the detent and slide tray locating means during projector operation compensates for the tolerances that exist in the slide tray locating means of the projector.

One of the objects of the present invention is to provide an improved slide tray for a slide projector of increased slide capacity, and particularly adaptable to slide projectors having locating and indexing means for the slide tray of the type disclosed in U.S. Pat. No. 3,236,113.

Another object of the invention is to provide an improved slide tray of increased slide capacity, and further having means for reducing the distance through which the tray is advanced in conformity with the reduced slide compartment size.

Another object of the invention is to provide an improved slide tray of increased slide capacity having lost motion means incorporated therein so that the distance through which the tray is advanced by a slide projector indexing means is reduced to compensate for the reduced slide compartment size.

Another object of the invention is to provide an improved slide tray having means coupling the slide tray to a slide tray indexing means so that the incremental distance the tray is advanced is different than the distance through which the slide tray indexing means is moved in the tray advancing direction.

Objects and advantages other than those set forth above will be apparent from the following description when read in connection with the drawings.

DESCRIPTION OF THE PREFERRED EMBODIMENT

Figure 2:
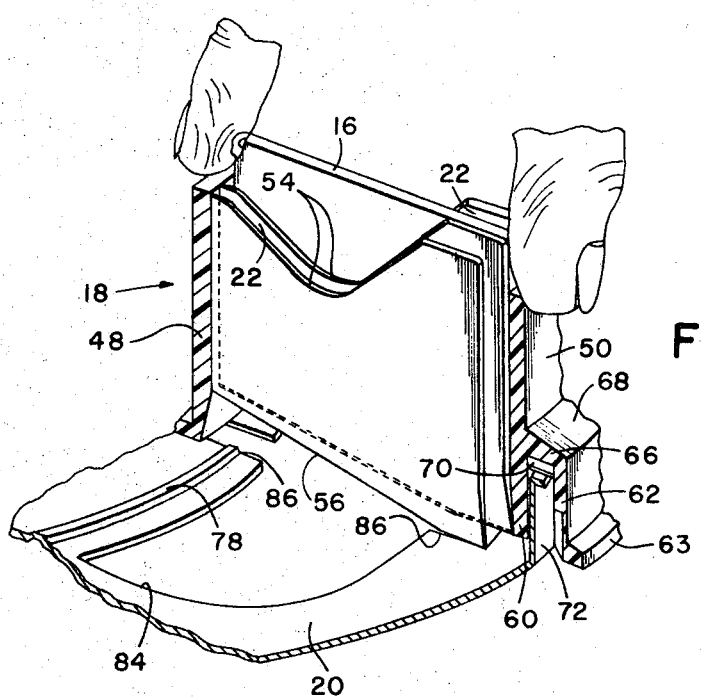
FIG. 2 is an enlarged, segmental view partially in section and partially broken away of a portion of the slide tray of FIG. 1 showing how a slide is withdrawn from a slide compartment.
Figure 7:
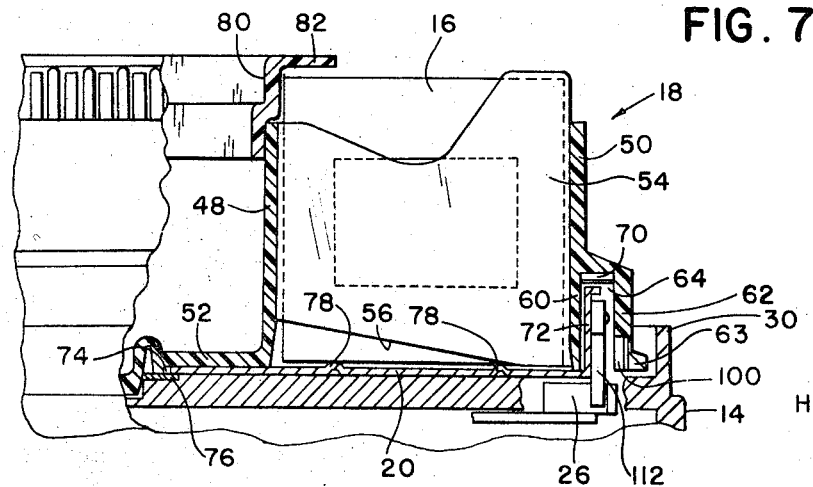
FIG. 7 is a segmental view of the slide tray with a portion thereof broken away and sectioned to show a side elevational view of the indexing means on the slide tray and projector.

The improved slide tray 12 of this invention is particularly adaptable for use in slide projections 14 of the general type disclosed in U.S. Pat. No. 3,276,314, in which indexing and locating means for the slide tray of the general type disclosed in U.S. Pat. No. 3,236,113 are incorporated. In general, the slide projector 14 has slide tray 12 mounted on top thereof for storing a plurality of slides 16 which are to be projected. The slide tray 12 has a compartmented body member 18 and a slide retaining member 20 movable relative thereto as seen in FIGS. 2 and 7, and means for manually or automatically cyclically indexing body member 18 relative to slide retaining member 20 in forward or reverse directions by incremental distances corresponding to the spacing of successive slide tray compartments 22 for bringing successive slides 16 into register with a slide projection gate 24 (See FIG. 3). The slide 16 in register with gate 24 is lowered by a slide transport means, not shown, into a slide viewing or projecting position in which the slide is in alignment with the optic system of the projector.

A slide changing cycle of the projector generally comprises returning a slide 16, if any, from its slide viewing position to its tray compartment 22, indexing slide tray 12 one slide compartment, and permitting the next succeeding slide 16 to be lowered into the slide viewing position. The indexing means for slide tray 12 generally comprises an indexing pawl 26 (see FIG. 3) on projector 14 that is moved outwardly in one direction into a position between two spaced indexing means on slide tray 12, and then moved laterally in relation to the one direction in a forward or reverse direction for moving slide tray body portion 18 an incremental distance for respectively advancing or reversing the slide tray body one slide compartment. A more detailed description of an indexing means of this type for a slide tray appears in the aforementioned U.S. Pat. 3,236,113.

The projector 14 further has a half-cycle position to provide editing and random access functions. In the half-cycle position, the slide transport means, not shown, returns a projected slide 16, if any, to slide tray 12 and retains it in that position, and a locating projection 28 for slide tray 12 is disabled. The operator may edit returned slide 16 for editing purposes, or manually move slide tray body portion 18 at random to any desired slide compartment 22 to project the slide contained therein upon completion of the cycle of operation. Although the improved slide tray 12 of this invention is shown and described as a circular slide tray for use in a slide projector of the type described, applicant's invention is not limited to circular slide trays but may be applicable to non-circular slide trays as well.

Figure 3:
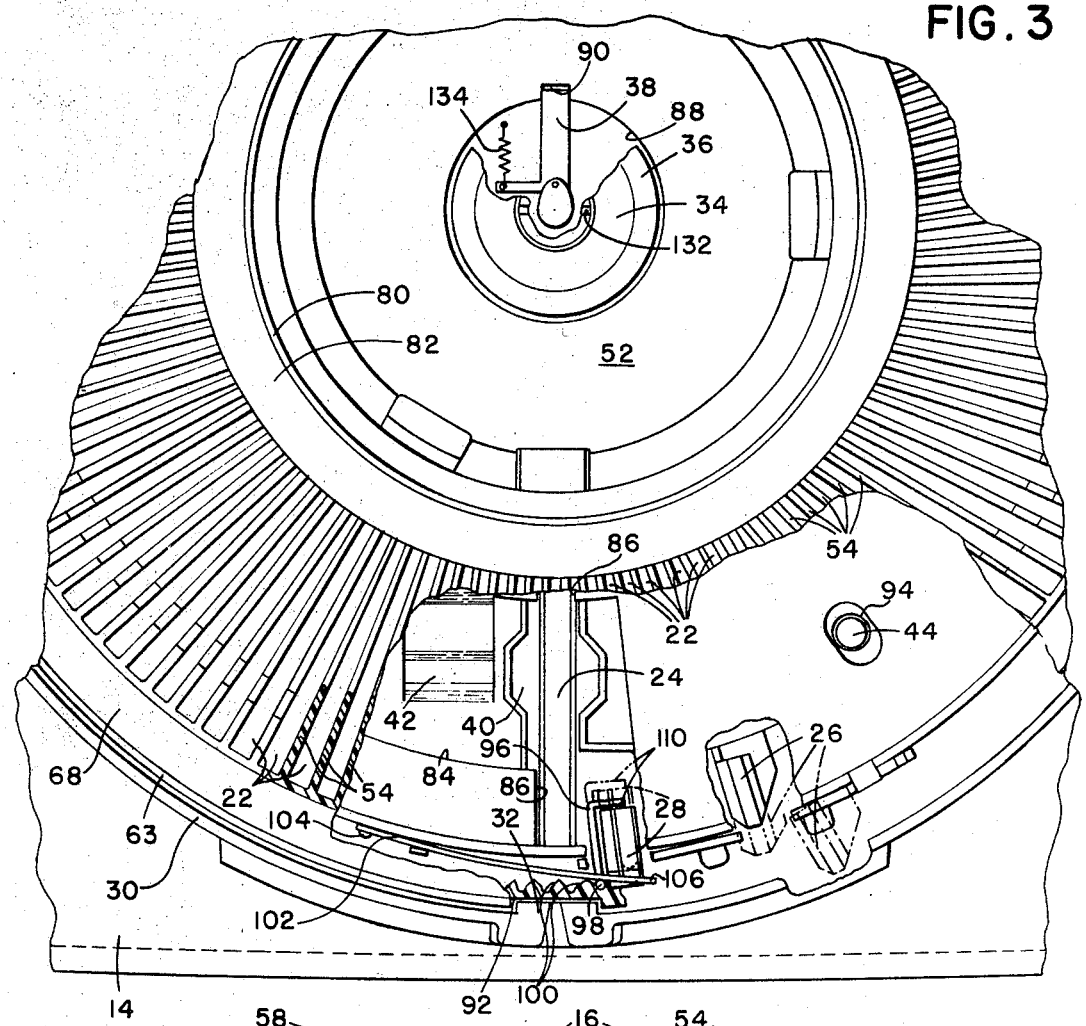
FIG. 3 is a segmental, top plan view of the slide tray and projector of FIG. 1 with portions broken away.

With reference to FIG. 3, the top of projector 14 has a circular inner rim 30 having a lip 32 carrying an index mark. The top of projector 14 further has an upwardly projecting central spindle 34 having a beveled top 36, and an opening, shown through which a spring-biased spindle key 38 extends. The top of projector 14 further has an opening 40 in register with slide gate 24, and an opening 42 through which warm air is directed over a plurality of slides 16 in slide tray 12 for "pre-popping" the slides before projection. The tray locating projection 28 extends through a portion of the opening 40, and indexing pawl 26 extends through an opening in the projector top. In addition, the top of projector 14 has a locating pin 44 for the slide tray, and further supports retaining member 20 which rests on the top of projector 14.

More specifically, body portion 18 of slide tray 12 comprises a unitary cylindrical plastic molding having concentric inner and outer walls 48, 50 respectively. The inner wall 48 is closed off at one end to form a base 52 (see FIGS. 3 and 7) and walls 48, 50 are joined together by radially extending spacers or separators 54 to form a plurality of the spaced compartments 22 for slides 16. In the embodiment shown, there are 141 equally spaced compartments, and slides placed therein are spaced too closely in side by side relation to permit removal of any one of the slides by manually grasping the slide at some point intermediate the inner and outer walls. Accordingly, walls 48, 50 are molded so that the height thereof is less than that of the slides 16 as best seen in FIG. 2. Since the slides extend above the upper edges of the walls, the operator may conveniently manually grasp any one of the slides on the opposite sides thereof between a thumb and forefinger for removing the slide from slide tray 12. It should be noted, however, that the separator 54 also extends above the upper edge of the outer wall (see FIGS. 2 and 7) and slightly above the upper edge of the slides to protect the otherwise exposed corner of the slides.

Figure 8:
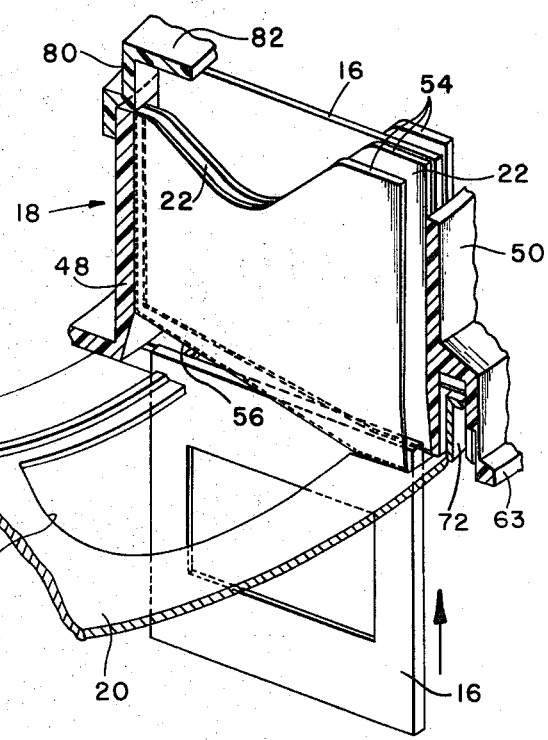
FIG. 8 is a segmental view partially in section and partially broken away of a portion of the slide tray showing a slide in position to be returned to its slide compartment.
Figure 9:
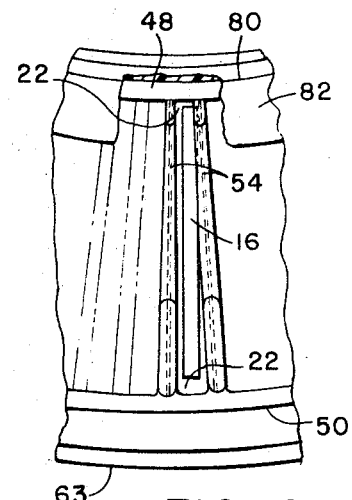
FIG. 9 is a segmental top plan view of FIG. 8 with the lock ring omitted for purposes of clarity.

The aforementioned spacers or separators 54 joining the inner and outer walls 48, 50 respectively, to form slide compartments 22 have the lower ends 56 thereof inclined with respect to the plane of the slide retaining member 20 as best seen in FIG. 7. Since the separators 54 extend radially, the space or distance between adjacent compartment separators 54 at outer wall 50 is considerably wider than the space or distance between adjacent compartments at inner wall 48. The inclined ends 56 of separator 54 facilitate returning a slide to its original tray compartment following the projecting operation. This is accomplished in each instance as best seen in FIGS. 8 and 9 by slide 16 initially entering compartment 22 at outer wall 50 where the distance between separators 54 is considerably greater than the width or thickness of a slide. The slide is guided by inclined end 56 of one of the separators into the smaller space between the separators 54 at inner wall 48 as the slide is being moved into the compartment 22. Since the space or distance between separators 54 at inner wall 48 is only slightly greater than the width or thickness of a slide 16, this inclined feature of the ends 56 of the separator insures that a bent or improperly aligned slide as seen exaggerated in FIG. 9 will be guided into the compartment 22 and will not jam against one of the separators 54 at inner wall 48.

Figure 1:
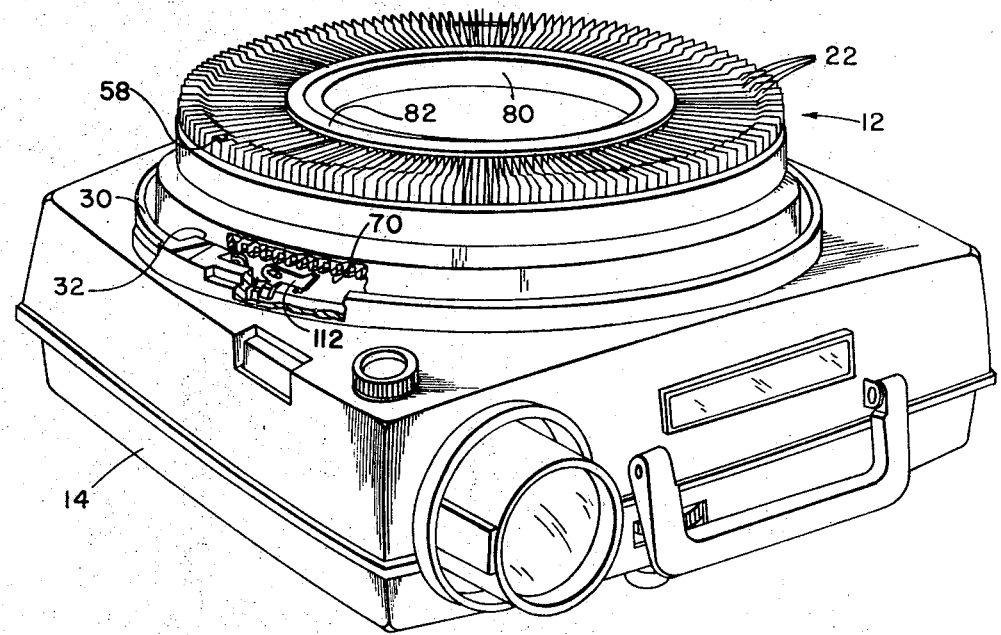
FIG. 1 is a front perspective view of the improved slide tray of this invention mounted on a slide projector, and having a portion thereof broken away to show the indexing means for the slide tray.

The 0 compartment, which is in register with projection gate 24 when tray 12 is properly mounted on projector 14, is not normally a slide holding or storing compartment, and has a bridge 58 (see FIGS. 1 and 4) extending thereacross to prevent the insertion of a slide 16 therein from the slide loading side or top of body portion 18 for a purpose to be explained hereinafter. All of the remaining compartments 22 are slide storing compartments, and are open at each end of body portion 18.

Figure 4:
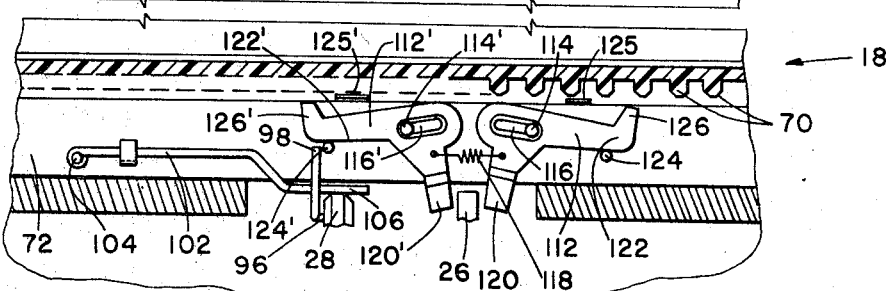
FIG. 4 is an enlarged, segmental, front elevation view of the slide tray and projector of FIG. 1 showing the indexing means for the slide tray in its normal inoperative position.
Figure 5:
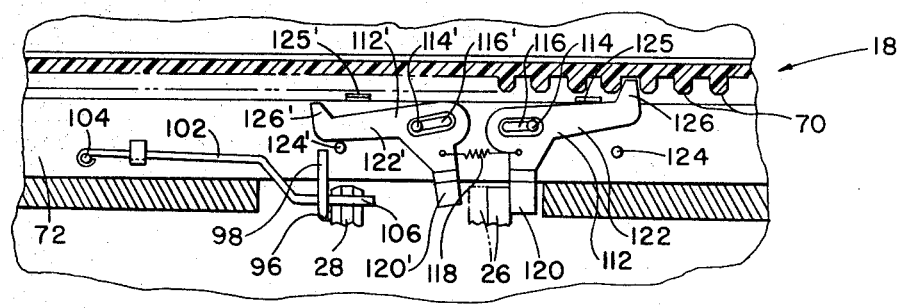
FIG. 5 is a view similar to FIG. 4 in which the indexing means on the tray has been moved to its operative position by the indexing means on the projector.
Figure 6:
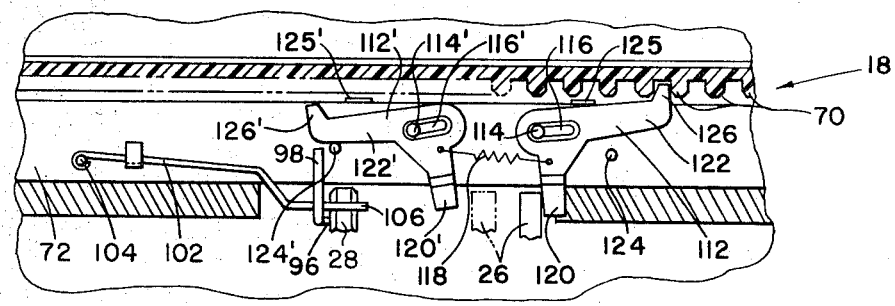
FIG. 6 is a view similar to FIGS. 4 and 5 in which the slide tray has been advanced one slide compartment by the cooperative action of the indexing means on the slide tray and projector.

The outer wall 50 of body portion 18 has an $h$ cross section, as best seen in FIGS. 2, 7 and 8, in which lower wall portions 60, 62 are spaced apart in parallel relationship to form an enlarged circular groove 64. The outer wall 50 has a portion 66 joining the two depending wall portions 60, 62, and portion 66 has an outer beveled surface 68 containing raised numerals, not shown, corresponding to and designating even or odd numbered compartments. The inner surface of connecting wall portion 66, which also forms the upper end of groove 64 as best seen in FIG. 7, is provided with a plurality of teeth 70 as seen in FIGS. 4–6 corresponding to the number of compartments 22 in slide tray 12. These teeth 70 form a part of the indexing means on slide tray 12 and will be explained in greater detail hereinafter.

The slide retaining member 20 on the bottom of slide tray 12 comprises an annular disc having an outer peripheral, transversely extending flange 72. The slide retaining disc 20 is mounted for rotation on the bottom of molded body portion 18 with the inner periphery of disc 20 abutting a circular rib 74 on base 52, and peripheral flange 72 extending into groove 64 formed by outer wall portions 60, 62. The disc 20 is retained for rotation on body portion 18 by an annular retaining ring 76 secured to body portion 18 by any known means. Slide mounts 16 inserted in slide tray compartments 22 are supported on circular rails 78 on disc 20, and retained in compartment 22 by an annular lock ring 80 of molded plastic or any other suitable material. This lock ring 80 fits within the upper end of inner wall 48, and has a peripheral flange 82 which overlaps slide compartment 22 to prevent the slides from falling out if slide tray 12 is tipped upside down, as in storage, or otherwise. The ring 80 has a plurality of angularly spaced stepped ramps, not shown, which twist lock on corresponding lugs, not shown, located on the inner periphery of inner wall 48. When rotated in one direction, ring 80 locks to retain slides 16 in slide tray 12. When rotated in the opposite direction, ring 80 unlocks for removal from the tray 12 to permit slide editing or loading.

The slide retaining disc 20 has an opening 84 (see FIG. 2) through which heated air expelled from projector opening 42 is directed. The heated air passes over those slides that are supported by disc 20 above opening 84 for preheating them when tray 12 is properly mounted on projector 14. The disc 20 has radially extending, aligned, notches merging with opening 84 to form a slide passageway 86 for uncovering slide compartments 22 one at a time during relative movement of disc 20 and body portion 18 of tray 12, and through which slides 16 can be transported from tray 12 to slide projection gate 24. When slide tray 12 is in a normal slide storing position, the O compartment thereof is in alignment with passageway 86. The bridge 58, in effect, disables the O compartment when slide tray 12 is in its normal slide storing position by blocking it off at the end of the compartment furthest removed from disc 20, thereby preventing the introduction of a slide 16 into the O compartment from that end and the consequent feeding of the slide through the slide passageway 86.

The base 52 of slide tray 12 has a central opening 88 (see FIG. 3) having a notch 90 along its inner periphery for receiving the corresponding spindle 34 and key 38 respectively, of projector 14 when slide tray 12 is mounted on projector 14. When slide tray 12 is initially placed on projector 14, spindle 34 extends through opening 88, and the rim 63 of wall portion 62, and base 52 of the tray bear on lip 32 and key 38 respectively allowing manual rotation of tray 12 by the operator. The tray is rotated until notches 90, 92 align with key 38 and lip 32 respectively, and are received thereby, causing tray 12 to drop into a loaded position. In this position, disc 20 has an opening 94 adapted to receive pin 44 on projector 14 for fixedly positioning disc 20 on projector 14 with slide passageway 86 in register with slide projection gate 24 of projector 14. The disc 20 remains fixed by virtue of the pin 44 and opening 94 connection, and body portion 18 is indexed as a unit relative to disc 20 by the indexing means for slide tray 12 to be explained hereinafter. Such indexing of body portion 18 during operation of the projector successively brings the slide compartments 22 and slides 16 contained therein into register with slide passageway 86 and slide projection gate 24.

Figure 11:
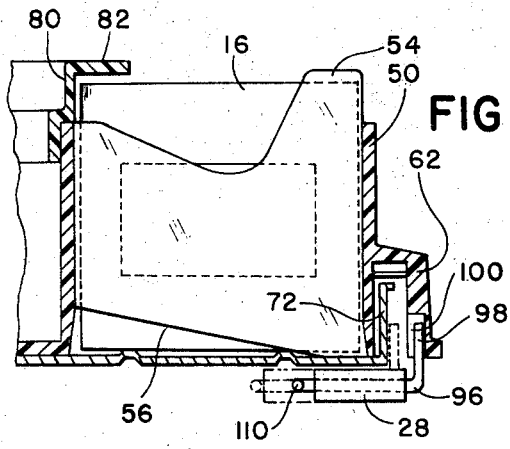
FIG. 11 is a section view taken along line 11—11 of FIG. 10.
Figure 10:
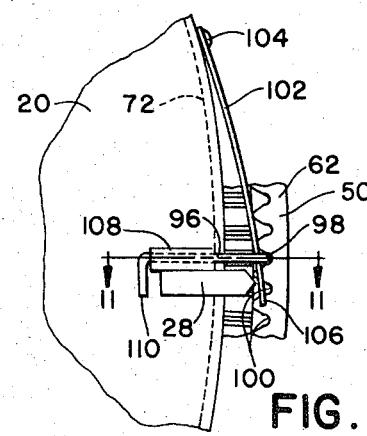
FIG. 10 is a segmental bottom view of the slide tray showing the detent means and tray locating means in its operative position.

Detent means as seen best in FIGS. 10 and 11 are provided for accomplishing the dual function of (1) releasably holding slide retaining disc 20 and body portion 18 in a normal non-rotatable slide storing position in which slide passageway 86 is in register with the O slide compartment, and (2) properly positioning body portion 18 with a slide compartment 22 in register with slide passageway 86 and slide projection gate 24. The detent means comprises a locator rod preferably of circular cross section such as a wire 96 having a bent end 98 that may be resilient or non-resilient, and that is movable into and out of engagement with one of a plurality of notches 100 formed along the inner wall of outer wall portion 62. The notches 100 correspond to slide compartments 22, and when the end 98 of locator wire 96 engages the bottom of a notch 100, one of the slide compartments 22 is in register with slide passageway 86. The locator wire end 98 is urged into notch 100 by a wire or leaf spring 102 having one end secured to flange 72 by any suitable means such as a rivet 104, and a portion adjacent its free end 106 secured to locator wire 96 by any suitable means. The spring 102 normally biases the resilient locator wire end 98 into one of the notches 100 for releasably holding body portion 19 and disc 20 in a non-rotatable position. The locator wire 96 is supported for generally radial movement by a plastic support member 108 secured to disc 20. When tray 12 is mounted on projector 14, a bent portion 110 on the opposite end of locator wire 96 is positioned in the path of and engageable by the reciprocally movable locating projection 28 of slide projector 14 when moved from its normal position through a cycle of operation. Accordingly, upon cycling of projector 14 through a cycle of operation, the rear end of locating projection 28 initially engages bent portion 110 of locator wire 96 and withdraws wire end 98 from one of the notches 100, releasing body portion 18 of tray 12 for movement relative to disc 20. The body portion 18 is then indexed one slide compartment by the indexing means to be described, and locating projection 28 is returned to its normal position in which wire end 98 is seated in the next succeeding notch 100 for properly positioning body portion 18 with the next succeeding slide compartment 22 in register with slide passageway 86 and slide projection gate 24. To compensate for the tolerances in locating projection 28 and its drive mechanism of projector 14, not shown, and to positively ensure that wire end 98 is driven all the way into notch 100, the free end 106 of spring 102 during the latter portion of the cycle of operation of projector 14 is engaged by the front end of locating projection 28 and urged radially outwardly causing locator wire end 98 secured thereto to be positively forced into notch 100. To accomplish this, the end 106 of spring 102 is located such that when slide tray 12 is initially mounted on projector 14, spring end 106 bears on the top of the front end of the normally positioned locating projection 28 as best seen in FIG. 4. When projector 14 is operated through a cycle of operation to project a slide, initial inward movement of projection 28 from its normal position permits slide tray 12 to fall by gravity causing retaining disc 20 to rest on the top surface of projector 14, and spring end 106 to drop into the path of locating projection 28 so that as projection 28 returns to its normal position at the completion of the cycle of operation, the front end thereof will engage spring end 106 and urge locator wire end 98 into notch 100. In this position, the resilience of spring 102, wire end 98 and the projector drive mechanism for projection 28 ensures proper seating of the locator wire end 98 in notch 100. Thus, precise alignment is achieved between slide compartment 22, slide passageway 86 in disc 20, and slide projection gate 24.

Figure 12:
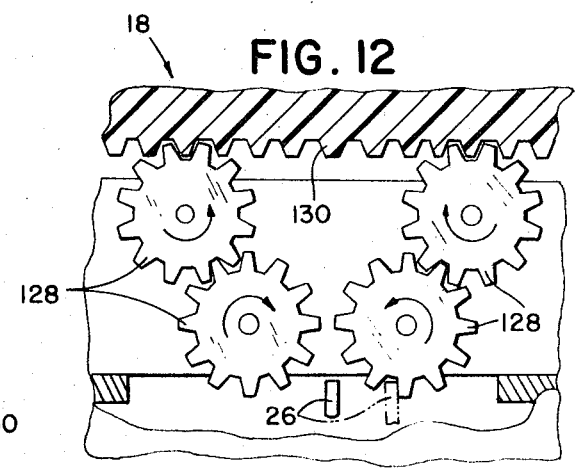
FIG. 12 is a view similar to FIG. 4 showing a different form of indexing mechanism for use in this invention.

The aforementioned indexing means for indexing body portion 18 of slide tray 12 relative to disc 20 thereof will now be described. The indexing means on tray 12 as best seen in FIGS. 4-6 comprises lost motion means in the form of a pair of identical indexing pawls 112, 112' for providing forward and reverse indexing of body portion 18. The pawls 112, 112' are pivotally movable about respective supporting studs 114, 114' carried by disc flange 72, and are further capable of movement in a forward or reverse direction by virtue of elongated slots 116, 116' through which respective supporting studs 114, 114' extend. In the normal inoperative position of pawls 112, 112', a spring 118 interconnects the pawls causing respective actuating ends 120, 120' thereof to be urged toward one another causing operating ends 122, 122' of the pawls to engage fixed stop pins 124, 124' on flange 72. Although pins 124, 124' are on flange 72, they could be mounted on any other suitable fixed member on projector 14. In this position, each of the studs 114, 114' is in engagement with one of the ends of the respective slots 116, 116', and the actuating ends 120, 120' of the pawls are spaced apart a sufficient distance to accommodate indexing lug 26 of the indexing means of the projector when slide tray 12 is mounted on projector 14. As previously indicated, the indexing means of the projector is of the type disclosed in the forementioned U.S. Pat. 3,236,113 in which the indexing lug, during a cycle of operation of the projector, is initially moved radially outwardly into the space between two projections on a slide tray, and then is moved laterally a predetermined distance in the general direction of movement of the slide tray for moving the tray in a selected forward or reverse direction. The forward and reverse indexing pawls 112, 112' are positioned on disc flange 72 in a predetermined relationship with body portion 18. During operation of projector 14 through a cycle of operation, a selected pawl 112, 112' is pivoted about its respective stud 114, 114' by indexing lug 26 causing its operating end 120, 120' to engage stops 125, 125' with dogs 126, 126' entering one of the notches formed between the spaced teeth 70 on the inner side of wall portion 66 as seen in FIG. 5. In timed relation thereto, locator wire end 98 is withdrawn from engagement with body portion 18 of tray 12. Continued movement of lug 26 through its predetermined distance in the tray moving direction moves the selected pawl 112, 112' and released body portion 18 of tray 12 a distance of one slide compartment 22 in the selected forward or reverse direction, which is different than the predetermined distance through which lug 26 is moved. The indexing lug 26, selected pawl 112, 112' and locating projection 28 then return to their normal positions as seen in full lines in FIG. 3 upon the completion of the cycle of operation. Although the indexing mechanism is shown as comprising a pair of spaced pawls, it should be readily apparent that other forms of indexing mechanisms may be utilized such as a pair of identical gear trains as seen in FIG. 12. Each gear train comprises two gears 128, one of which meshes with a gear rack on the body portion 18 of tray 12, and the other of which is engaged and indexed by indexing lug 26. The gears 128 are provided with a predetermined number of gear teeth and preselected gear ratio to provide the desired incremental movement of body portion 18 of tray 12, which is less than the predetermined distance through which lug 26 is moved in the tray moving direction.

After the first cycle of operation, the operator is prevented from removing slide tray 12 from projector 14 by the interaction between rim 63 and lip 32, and between key 38 and the inner periphery of base 52 forming opening 88 (see FIG. 3). If the tray indexing mechanism should become inoperative for any reason, the operator may remove slide tray 12 from projector 14 by an emergency screw 128 centrally located in spindle 34 and interlinked with key 38 so that when screw 132 is turned by a screw driver or the like in a counterclockwise direction, key 38 is retracted into spindle 34 against the bias of a spring 134.

The invention is described in detail with particular reference to preferred embodiments thereof, but it will be understood that variations and modifications can be effected within the scope of the invention as described hereinabove and as defined in the appended claims.

I claim:
1. In a slide tray, the combination comprising:
 a first member having a plurality of slide compartments;
 a second member movable relative to said first member and cooperating therewith to releasably hold a plurality of slides,
 said second member having means for uncovering one slide compartment at a time to release the slide contained therein;
 detent means cooperating with said first and second members, and movable between an operative position for holding said members in a precisely aligned relation, and an inoperative position for allowing relative movement between said members;
 first indexing means on said first member; and
 lost motion means on said second member adapted to be coupled to said first indexing means for indexing said first member relative to said second member when said detent means is in its inoperative position.

2. The invention according to claim 1 wherein said first indexing means comprises spaced projections forming notches therebetween on said first member, and said lost motion means is movable into a selected one of said notches for engaging and moving one of said projections.

3. The invention according to claim 1 wherein said first indexing means comprises spaced projections forming notches therebetween on said first member, and said lost motion means comprises a pawl movable in one direction into a selected one of said notches, and then movable in a different direction for engaging and moving one of said projections and thereby said first member.

4. The invention according to claim 1 wherein said first indexing means comprises spaced projections forming notches therebetween on said first member, and said lost motion means comprises a pin on said second member, a pawl having an elongated slot for receiving said pin and engageable with said notches, and means for biasing said pawl into a normal inoperative position in which said pin engages a shoulder on said pawl forming one end of said slot and said pawl is withdrawn from engagement with a selected one of said notches, said pawl being pivotally movable about said pin from said inoperative position to an operative position in which said pawl enters one of said notches, said pawl further being movable while in said operative position for engaging and moving one of said projections and thereby said first member relative to said second member by virtue of said pin and slot connection.

5. The invention according to claim 1 wherein said first member comprises spaced walls, and separators interconnecting said walls to form slide compartments, said walls having a height less than the height of a slide in said compartment, and said separators having a height substantially equal to the height of a slide.

6. The invention according to claim 1 wherein said first member comprises spaced walls, one of said walls having a bifurcated end to form a groove, said second member comprises a plate-like member having a peripheral, transversely extending flange extending into said groove, and said first indexing means comprises spaced projections forming notches therebetween on said bifurcated end, and said lost motion means is located on said flange and movable into a selected one of said notches for engaging and moving one of said projections and first member.

7. The invention according to claim 1 wherein said first member comprises spaced walls, one of said walls having a bifurcated end to form a groove, said second member comprises a plate-like member having a peripheral, transversely extending flange extending into said groove, and said first indexing means comprises spaced projections forming notches therebetween on said bifurcated end, and said lost motion means is located on said flange and movable into a selected one of said notches for engaging and moving one of said projections and first member, said lost motion means comprising a pawl movable in one direction into a selected one of said notches, and then movable in a different direction for engaging and moving one of said projections and thereby said first member.

8. The invention according to claim 1 wherein said first member comprises spaced walls, one of said walls having a bifurcated end to form a groove, said second member comprises a plate-like member having a peripheral, transversely extending flange extending into said groove, and said first indexing means comprises spaced projections forming notches therebetween on said bifurcated end, and said lost motion means is located on said flange and movable into a selected one of said notches for engaging and moving one of said projections and first member, said lost motion means comprising a pin on said flange, a pawl having an elongated slot for receiving said pin, and a spring for holding said pawl in a normal inoperative position, in which said pin engages a shoulder on said pawl forming one end of said slot and said pawl is withdrawn from engagement with said projections, said pawl being pivotally movable about said pin from said inoperative position to an operative position, in which said pawl enters one of said notches, said pawl further being movable while in said operative position for engaging and moving one of said projections and thereby said plate-like member relative to said second member by virtue of said pin and slot connection.

9. In a slide tray, the combination comprising:
   a first member comprising spaced walls, and separators interconnecting said walls to form slide compartments;
   a second member movable relative to said first member and cooperating therewith to releasably hold a plurality of slides, said second member having means for uncovering one slide compartment at a time to release the slide contained therein; and
   detent means for said members and movable between an operative position, in which said members are releasably held together for holding said slices with one of said slide compartments in register with said uncovering means, and an inoperative position, in which said detent is disabled and said members are movable relative to one another for releasing said slides in succession through said slide compartment uncovering means,
   said detent means comprising a plurality of spaced projections forming notches therebetween on said first member corresponding to said slide compartments, and locating means on said second member,
   said locating means comprising a flexible rod-like locating element movable on said second member into and out of engagement with a selected one of said notches, and resilient means for biasing said locating element into engagement with a selected notch.

10. The invention according to claim 9 wherein said locating element comprises a wire slidably movable on said second member and having a bent end movable into and out of engagement with a notch.

11. The invention according to claim 9 wherein said locating element comprises a wire slidably movable on said second member and having a bent end movable into and out of engagement with a notch, and said resilient means comprises a wire spring having one end secured to said second member and another portion thereof secured to said wire.

12. The invention according to claim 9 wherein said first member is circular, said second member comprises an annular disc having a peripheral transversely extending flange, said locating element comprises a wire slidably, radially movable on said disc and having a bent end movable and out of engagement with a notch, and said resilient means comprises a wire spring having one end secured to said flange and another portion thereof secured to said wire.

13. In a slide tray for use in a slide projector of the type having a projection reciprocally movable to and from a normal first position and cooperating with the tray for positioning the tray in a predetermined position, the combination comprising:
   a first member comprising spaced walls, and separators interconnecting said walls to form slide compartments;
   a second member movable relative to said first member and cooperating therewith to releasably hold a plurality of slides, said second member having means for uncovering one slide compartment at a time to release the slide contained therein, and
   detent means for said members and movable between an operative position, in which said members are releasably held together for holding said slides with one of said slide compartments in register with said uncovering means, and an inoperative position, in which said detent is disabled and said members are movable relative to one another for releasing said slides in succession through said slide compartment uncovering means,
   said detent means comprising a plurality of spaced projections forming notches therebetween on said first member corresponding to said slide compartments, and locating means on said second member,
   said locating means comprising a locating element movable on said second member into and out of engagement with a selected one of said notches, and resilient means for biasing said locating element into engagement with a selected notch,
   said resilient means having a portion thereof adapted to bear on the movable projection in its normal first position when the tray is initially mounted on the slide projector, said portion moving into the path of the projection during movement of the projection from its normal first position, and being engaged by the projection upon return movement to its normal first position for forcing said locating element into engagement with a selected notch.

14. In a slide tray for use with a slide projector having a slide tray indexing means movable through a predetermined distance in the tray advancing direction for successively advancing said slide tray incremental distances in forward or reverse directions, the combination comprising:
   first indexing means on said slide tray; and lost motion means for coupling said first indexing means to the slide tray indexing means of the slide projector whereby the incremental distance the slide tray is advanced is different than said predetermined distance.

15. The invention according to claim 14 wherein said first indexing means comprises spaced projections, and said lost motion means comprises a pawl movable from a normal projection disengaged position to a position in engagement with at least one of said projections.

11

16. The invention according to claim 15 wherein said pawl is pivotally mounted on said slide tray and has one end engageable and movable by the slide tray indexing means of the slide projector for moving its opposite end into engagement with at least one of said projections.

17. The invention according to claim 14 wherein said first indexing means comprises spaced projections, and said lost motion means comprises gear means coupling said spaced projections to the slide tray indexing means.

18. In a slide tray for use with a slide projector having a slide tray indexing lug movable through a predetermined tray moving distance for successively advancing a reference slide tray predetermined incremental distances substantially equal to said tray moving distance for positioning successive slides in a predetermined position, the combination comprising:

first indexing means on said slide tray; and
lost motion means on said slide tray for coupling said first indexing means to said indexing lug whereby movement of said indexing lug through said predetermined tray moving distance advances said slide tray through a distance less than said predetermined incremental distance.

19. In a slide tray for use with a slide projector having an indexing lug cyclically movable through a predetermined tray moving distance for advancing the slide tray, said slide tray having a plurality of slide compartments of equal size movable by said indexing lug a predetermined slide compartment distance which is substantially equal to said tray moving distance for successively positioning each of the slide compartments in a predetermined position, the combination comprising:

first indexing means on said slide tray; and
second indexing means on said slide tray for coupling said first indexing means to said indexing lug so that movement of said indexing lug through said predetermined tray moving distance moves said slide tray through a slide compartment distance which is different than said predetermined tray moving distance.

20. For use with a slide projector having means for receiving a slide tray and having a first indexing means movable through a first indexing means movable through a first distance for indexing a received tray, the combination comprising:

indexable tray means for containing slides, said tray means being receivable by said receiving means; and
second indexing means engageable with said tray means and said first indexing means for providing indexing movement through a second distance less than said first distance to said tray means in response to movement by said first indexing means through said first distance.

21. In combination:

a slide projector having means for receiving a first slide tray and a first indexing means engageable with said tray and movable through a first distance for indexing said first tray; and
means for adapting said projector to receive and index a second tray adapted to be indexed by movement through a second distance less than said first distance, said adapting means comprising a member engageable both with said second tray and said first indexing means for providing indexing movement through said second distance to said second tray in response to movement by said projector indexing means through said first distance.

References Cited

UNITED STATES PATENTS

| | | | |
|---|---|---|---|
| 3,386,195 | 6/1968 | Pester et al. | 40—79X |
| 3,455,441 | 7/1969 | Baring | 40—79X |

HARRY N. HAROIAN, Primary Examiner

PO-1050
(5/69)

UNITED STATES PATENT OFFICE
CERTIFICATE OF CORRECTION

Patent No. 3,554,639          Dated January 12, 1971

Inventor(s) Herbert T. Robinson

It is certified that error appears in the above-identified patent and that said Letters Patent are hereby corrected as shown below:

Column 3, line 31, "projections" should read --projectors--.

Column 10, line 15, after "movable" insert --into--.

Column 12, lines 5-6, delete "indexing means movable through a first".

Signed and sealed this 1st day of June 1971.

(SEAL)
Attest:

EDWARD M. FLETCHER, JR.
Attesting Officer

WILLIAM E. SCHUYLER, JR.
Commissioner of Patents